United States Patent
Held et al.

(10) Patent No.: US 10,036,628 B2
(45) Date of Patent: Jul. 31, 2018

(54) MEASURING DEVICE FOR AN OPTICAL MEASURING SYSTEM

(71) Applicant: CARL ZEISS INDUSTRIELLE MESSTECHNIK GMBH, Oberkochen (DE)

(72) Inventors: Tobias Held, Noerdlingen (DE); Dieter Kaufmann, Heideheim (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 0 days.

(21) Appl. No.: 15/714,023

(22) Filed: Sep. 25, 2017

(65) Prior Publication Data

US 2018/0094914 A1    Apr. 5, 2018

(30) Foreign Application Priority Data

Sep. 30, 2016  (DE) .................. 10 2016 118 616

(51) Int. Cl.
*G01B 11/00*    (2006.01)
*G06T 7/73*     (2017.01)

(52) U.S. Cl.
CPC .............. *G01B 11/007* (2013.01); *G06T 7/73* (2017.01); *G06T 2207/30204* (2013.01)

(58) Field of Classification Search
CPC ................................ G01B 11/007; G06T 7/73
USPC ......................................................... 356/620
See application file for complete search history.

(56) References Cited

U.S. PATENT DOCUMENTS

| | | | | |
|---|---|---|---|---|
| 4,942,671 | A * | 7/1990 | Enderle | G01B 11/007 33/556 |
| 5,150,529 | A * | 9/1992 | Collingwood | G01B 21/047 33/503 |
| 5,425,180 | A | 6/1995 | Breyer | |
| 5,440,392 | A * | 8/1995 | Pettersen | G01B 11/00 356/601 |
| 5,724,745 | A | 3/1998 | Brenner et al. | |
| 5,862,604 | A | 1/1999 | Fuchs et al. | |
| 5,973,788 | A * | 10/1999 | Pettersen | G01S 5/163 356/614 |
| 6,279,246 | B1 * | 8/2001 | van den Bossche | G01B 11/00 33/1 CC |

(Continued)

FOREIGN PATENT DOCUMENTS

| | | |
|---|---|---|
| DE | 10258579 A1 | 7/2004 |
| DE | 102008049751 A1 | 4/2010 |

(Continued)

OTHER PUBLICATIONS

OptiTrace http://optinav.pl/en/info/products/optitrace.html.

*Primary Examiner* — Roy M Punnoose
(74) *Attorney, Agent, or Firm* — Harness, Dickey & Pierce, P.L.C.

(57) ABSTRACT

A measuring device for an optical measuring system, comprising a rigid body which comprises a probe body or a tool and on which a first optical marker is arranged. The measuring device further comprises a holding part for holding the measuring device by hand or for clamping the measuring device in a machine. At least a second optical marker is arranged on the holding part. Still further, the measuring device comprises a spring element which connects the rigid body to the holding part.

20 Claims, 3 Drawing Sheets

(56) References Cited

U.S. PATENT DOCUMENTS

| | | | | |
|---|---|---|---|---|
| 7,576,836 | B2* | 8/2009 | Bridges | G01B 11/002 356/3.13 |
| 8,983,795 | B2 | 3/2015 | Lotze et al. | |
| 9,278,454 | B2* | 3/2016 | Mimura | B25J 13/006 |
| 9,557,159 | B2* | 1/2017 | Ikebuchi | G01B 11/005 |
| 2006/0053648 | A1* | 3/2006 | Ruijl | G01B 5/012 33/559 |

FOREIGN PATENT DOCUMENTS

| | | |
|---|---|---|
| DE | 102015205615 A1 | 10/2015 |
| EP | 0556574 A2 | 8/1993 |
| EP | 0599513 A1 | 6/1994 |
| EP | 0753717 A2 | 1/1997 |
| EP | 0703517 B1 | 3/2000 |
| EP | 1984695 B1 | 10/2008 |
| EP | 2172735 B1 | 9/2013 |
| WO | 2006114627 A1 | 11/2006 |

* cited by examiner

MEASURING DEVICE FOR AN OPTICAL MEASURING SYSTEM

CROSS-REFERENCE TO RELATED APPLICATION

This application claims Convention priority of German patent application 10 2016 118 616.3, filed on Sep. 30, 2016. The entire content of this priority application is incorporated herein by reference.

BACKGROUND OF THE INVENTION

The present disclosure relates to a measuring device for an optical measuring system, with a rigid body which comprises a probe body or a tool, and with a holding part for holding the measuring device by hand or for clamping the measuring device in a machine, wherein at least one optical marker is arranged on the measuring device and is detectable via a camera in order to be able to determine the position of the measuring device, in particular the position of the probe body or of the tool of the measuring device.

The present disclosure further relates to a measuring system with such a measuring device, a camera for capturing image data of the measuring device, and an evaluation and control unit which is configured to evaluate the image data captured by the camera and, from these data, to determine position data of the measuring device.

An exemplary measuring device and an exemplary measuring system are known from DE 10 2015 205 615 A1.

Measuring systems with measuring devices of this kind are used, for example in the context of quality assurance, to check workpieces or to fully determine the geometry of a workpiece in the context of what is called reverse engineering. Moreover, diverse further application possibilities are conceivable, such as process-controlling applications, in which the measurement technique is applied directly for on-line monitoring and regulation of manufacturing and machining processes. A common application example is that of checking vehicle body components in respect of possible manufacturing faults. In principle, however, such measuring systems can be used to measure any type of measurement objects.

Measuring systems having handheld measuring devices serve as an alternative to more complicated coordinate-measuring appliances in which the workpieces are measured either optically and/or in a tactile manner on a stationary or permanently installed machine with a relatively complex structure.

On account of the mobile usability, measuring systems having handheld measuring devices are becoming increasingly important since they would extend the range of uses yet further in comparison with stationary or permanently installed coordinate-measuring appliances solely on account of their more flexible usability. However, the extremely stringent requirements made in terms of the measurement accuracy that these measuring systems are intended to deliver often militate against the usability of such a mobile measuring system. It is true that manifold digital-optical possibilities now exist, in particular software methods, in order that, from images or films of objects or scenes, the spatial structure of the imaged objects in the scene can be deduced. However, in principle, these methods have some shortcomings which result in them currently not yet being feasible for many highly precise measurements and instead being used only for measurements which have lower requirements in terms of the measurement accuracy.

In the measuring system known from DE 10 2015 205 615 A1, a tactile probe head, which can be used to manually scan a workpiece to be measured, is arranged on a manually portable measuring device. Furthermore, a plurality of optical markers are arranged on the handle of the measuring device and regularly emit infrared beams which are captured from outside using a camera system. The camera images captured by the camera system are evaluated in a computing unit, the position and orientation of the markers in space being calculated by means of a suitable computing algorithm. This is usually carried out using optical triangulation methods. The location and position of the probe head or of the probe body relative to the markers can be determined by means of a calibration step. If a user guides the measuring device by hand towards a workpiece, with the result that the probe body touches the workpiece, a measuring point on the workpiece can thus be determined The shape and location of the workpiece relative to the camera system ultimately result from a suitable multiplicity of such measuring points.

However, the measuring system known from DE 10 2015 205 615 A1 has at least two important disadvantages. On the one hand, active infrared light sources are used as markers. Such active markers which are integrated in the handheld measuring device have the disadvantage that, on account of the development of heat caused by them, they give rise to material expansions which can result in measurement errors. Such measurement errors cannot be disregarded at all in optical measurement technology. On the other hand, in the system known from DE 10 2015 205 615 A1, the user has to manually actuate a button on an actuation unit in order to signal to the computing unit that a measuring point is intended to be captured or in order to store a currently captured measuring point. Since the user inevitably exerts a force for this purpose, the magnitude and direction of which force are unknown, the probe head can be readily deformed, shaken or shifted. This results in measurement errors which cannot be readily compensated.

Similar problems also arise in a system sold by Optinav under the name "OptiTrace" (http://optinav.pl/en/info/products/optitrace.htlm, retrieved on 22 Dec. 2015). Although no active markers are used here on the measuring device, a button on the computing unit or the measuring device also has to be actuated here in order to capture and store a measuring point.

In stationary or permanently installed coordinate-measuring appliances, the abovementioned problem of adopting a measuring point, that is to say capturing and storing the measuring point, is often solved by means of additional sensors which are integrated in the probe head of the coordinate-measuring appliance. One example of such a system is known from WO 2006/114627 A1. In this case, the probe body or the measuring tip is coupled to the quill of the coordinate-measuring appliance via springs of the probe head. The movement of the probe head relative to the quill is determined using a measuring system. Such probe heads are also referred to as passively measuring sensors for coordinate-measuring appliances.

A similar measuring probe having a load sensor, which is integrated therein, measures the force acting between probe body and workpiece and controls the measurement recording on the basis of the signal generated by the load sensor, is known from EP 1 984 695 B1.

Although such sensors could also be used in handheld measuring systems, this would considerably increase the overall complexity of the measuring system. In particular, as a result of the additional sensors, further active components would be accommodated in the measuring system, with the result that temporal synchronization of the sensor signals with the signals from the optical tracking system would be required.

A further example of a handheld coordinate-measuring appliance is known from EP 0 703 517 B1. Apart from the relatively high degree of complexity of this system, the mobile usability is restricted here by the fact that the probe head is connected to a fixed column via a movably mounted carrier.

SUMMARY OF THE INVENTION

It is thus an object to provide a measuring device of the above-mentioned type, which is guided by hand or by means of a robot, and an associated optical measuring system which, in contrast to the above-mentioned devices and systems from the prior art, has a simpler structure, manages as far as possible without active components in the measuring device and can be used to achieve a higher degree of measurement accuracy. It is in particular an object to provide a measuring system with the aid of which the amount and direction of the measuring force acting between the handheld measuring device and the measurement object during the measuring procedure can be calculated as simply as possible.

According to an aspect of the present disclosure, a measuring device for an optical measuring system is presented, comprising:

a rigid body which comprises a probe body or a tool, wherein a first optical marker is arranged on the rigid body;

a holding part for holding the measuring device by hand or for clamping the measuring device in a machine, wherein at least a second optical marker is arranged on the holding part; and a spring element which connects the rigid body to the holding part.

According to a further aspect of the present disclosure, a measuring system is presented which comprises:

a measuring device having:

(i) a rigid body which comprises a probe body or a tool, wherein a first optical marker is arranged on the rigid body, (ii) a holding part for holding the measuring device by hand or for clamping the measuring device in a machine, wherein at least a second optical marker is arranged on the holding part, and (iii) a spring element which connects the rigid body to the holding part, a camera for capturing image data of the measuring device; and an evaluation and control unit, which is configured to evaluate the image data captured by the camera and to determine position data of the measuring device based on said image data.

The measuring device has at least two optical markers arranged on different structural parts of the measuring device (namely the rigid body and the holding part) which are connected to each other via a spring element. By evaluation of the image data captured by the camera, it is therefore possible, with the aid of the optical markers, to detect not only the overall movement of the measuring device but also a relative movement between the rigid body and the holding part of the measuring device. Contact between the probe body or tool of the measuring device and a workpiece to be measured usually causes such a relative movement between the holding element and the rigid body on which the probe body or the tool is arranged. Probing can thus be detected by evaluation of the camera images.

Since the mechanical properties of the spring element can be determined beforehand, the force exerted on the probe body or the tool during the probing can also be calculated on the basis of the detectable relative movement between the holding element and the rigid body and on the basis of the mechanical properties of the spring element. This permits many different application possibilities of the measuring device and the measuring system.

The actuation of an additional button, as is the case in the measuring device known from DE 10 2015 205 615 A1 for example, is not necessary in the herein presented measuring device, since probing is detectable automatically by evaluation of the camera images. Moreover, no further sensors have to be integrated into the measuring device in order to be able to calculate the measuring force that arises during probing. Thus, the measuring device is not only comparatively more advantageous in terms of production, it also permits more accurate measurement results in comparison with the optical measuring systems with handheld measuring devices previously known from the prior art.

It will be noted that the measuring device cannot only be guided by hand but can also be clamped in a machine, for example a robot. The holding part can be configured correspondingly depending on the intended use. For example, the measuring system can also be used in workpiece processing machines, wherein the measuring device is clamped in a corresponding clamping device of the machine, and the probe body customarily present on the rigid body for measuring devices is replaced by a tool with which the workpiece is machined. The force which the processing machine with the tool exerts on the workpiece during the machining can be calculated with the aid of the optically determined relative movement between the rigid body and the holding part.

Irrespective of the type of use of the measuring system, the evaluation in each case takes place in principle as follows: The camera of the measuring system, which can in principle be in the form of a single camera but preferably comprises a plurality of cameras, is configured to capture an image or an image sequence containing the measuring device and its first and second optical markers in order to generate corresponding image data therefrom. The evaluation and control unit is configured to evaluate the image data captured by the camera and, from these data, to determine position data of the measuring device which contain the three-dimensional coordinates of the probe body or of the tool. The position and location of the rigid body can be determined with the aid of the first optical marker. The position of the probe body or of the tool relative to the first optical marker is preferably known. This can be determined, for example, in an upstream calibration step. Thus, by evaluating the camera images, the position of the probe body or of the tool can be determined with the aid of the first optical marker. By evaluating the positions of both optical markers, it is then possible to determine movement data of the holding part relative to the rigid body, said movement data characterizing the movement of the holding part relative to the rigid body over time.

The optical markers or marker elements are markers that are suitable for the optical tracking of bodies.

According to a refinement, the first optical marker comprises at least three optical marker elements distributed on the rigid body.

Although one maker element is sufficient in principle, the position and location can be determined more easily with three distributed marker elements than is possible with just one optical marker element. The individual marker elements can thus also be of a comparatively simple design.

According to a further a refinement, the marker elements are passive optical marker elements which are arranged in one common plane.

This has the advantage that passive marker elements do not cause heat to be introduced into the measuring device, which could have a negative effect on the measurement accuracy. In comparison with active marker elements, this also has advantages in terms of the production costs of the measuring device.

It will be appreciated that, instead of having just one marker element, the second optical marker can also have three or more marker elements, which are preferably designed as passive optical marker elements.

According to a further refinement, the rigid body is substantially rod-shaped, wherein the first optical marker is arranged in the area of a first end of the rigid body and the probe body or the tool is arranged in the area of a second end of the rigid body lying opposite the first end, wherein the spring element engages the rigid body between the first end and the second end.

In this way, it is possible to achieve a maximum possible lever action during the probing. This in turn has the advantage that the deflection of the first optical marker per unit of force exerted on the probe body or the tool is as great as possible, and therefore the movement of the rigid body relative to the holding part is very easily detectable.

If the measuring device is used for measuring tasks of the kind that usually arise in coordinate-measuring appliances, the rigid body preferably comprises a probe body which is designed as a probe sphere or probe tip.

According to a further refinement, the spring element preferably comprises a spring parallelogram and/or a cardan spring element.

In the present case, a "cardan spring element" is understood as meaning a spring element whose spring action takes effect not just along one axis but instead along at least two axes that are preferably oriented orthogonally with respect to each other. Although spring parallelograms or cardan spring elements are preferred for the present use, it is nonetheless likewise possible to use conventional tension-compression spring elements.

According to a further refinement, the measuring device comprises a damping element which connects the rigid body to the holding part. The rigid body is then preferably connected to the holding part solely via the spring element and the damping element.

The damping element has the advantage of being able to suppress vibrations which lead to undesired measurement noise. In a handheld measuring device in particular, the contact between the probe body and the workpiece to be measured can be readily maintained without causing unsteady or abrupt movements of the probe body.

According to a refinement, the damping element is designed as a magnetic damper. It is preferable to use a magnetic damper that employs an eddy current damping principle. Here, a solid body made of conductive material is moved through a magnetic field, as a result of which eddy currents are induced. As is known from Lenz's law, the body is in this case acted upon by a force that opposes the cause of the eddy currents, i.e. the movement. A damping brake action is thus obtained.

As an alternative to this, the damping element can be designed as a fluidic damper. As a further alternative, the damping element can be designed as an elastomeric damper.

With various embodiments of the measuring device having been discussed above, several possible embodiments of the entire measuring system are now set out below.

According to a refinement, the evaluation and control unit is configured to use the image data captured by the camera in order determine, on the basis of the first optical marker, position data of the rigid body which describe the position and location of the rigid body in space, and in order to determine, on the basis of the first and second optical markers, position data of the holding part which describe the relative position of the holding part relative to the rigid body.

The position data of the rigid body are preferably data which describe the absolute position and location of the rigid body for a multiplicity of measuring points in the form of coordinates in a fixed coordinate system. By contrast, the position data of the holding part are preferably data which describe the relative position of the holding part relative to the rigid body for a multiplicity of measuring points in the form of coordinates in a coordinate system fixed on the rigid body. However, it will be appreciated that the position data of the holding part can also be described in the form of coordinates in a fixed coordinate system, such that the relative position of the holding part relative to the rigid body can then be determined from the difference of the position data of the holding part and the position data of the rigid body.

According to a further refinement, the evaluation and control unit is configured to use the position data of the holding part (position relative to the rigid body) and a stiffness known from the spring element in order to calculate a force which is applied to the probe body or the tool of the measuring device. The force calculated in this way can be utilized for various application possibilities.

According to a further refinement, the evaluation and control unit is configured to use the position data of the rigid body in order to determine position data of the probe body or of the tool which describe the position and location of the probe body in space, to use the calculated force in order to determine a correction vector, and to use the position data of the probe body and the correction vector in order to determine corrected position data of the probe body.

On the basis of the abovementioned calculation of the force that acts between the workpiece to be measured and the probe body or tool during the measurement procedure, it is thus possible to calculate the deformation of the probe body, of the tool or of the entire rigid body. For this purpose, the mechanical stiffness properties of the rigid body simply have to be determined beforehand, for example during calibration measurements or by means of tests. The calculation of the deformation of the rigid body on account of the occurring force, i.e. the calculation of the correction vector, makes it possible to compensate for the measurement errors that arise through internal deformations inside the measuring device. Additional sensors integrated in the measuring device, as are proposed in WO 2006/114627 A1, are not necessary for this purpose.

With the aid of the abovementioned optical evaluation of the position data of the rigid body and the position data of the holding part relative to the rigid body, it is also possible to calculate the force-free state, for individual measuring points, by extrapolation of the position data or force data. The force-free state is understood as the state when the probe body contacts the object to be measured but is not yet deformed, i.e. exactly the moment of first contact. This can take place according to a principle similar to the one described in EP 0 753 717 A2, EP 0 556 574 A2 or EP 0 599

513 A1. Further details in this regard are explained below in the description of the figures.

According to a further refinement, the measuring system comprises an optical, acoustic or haptic actuator, wherein the evaluation and control unit is configured to generate an optical, acoustic or haptic signal via the actuator when the calculated force exceeds a first threshold value and/or drops below a second threshold value.

This can assist the user of the measuring system in a scanning procedure in which a multiplicity of measuring points are measured continuously. Such scanning methods are not really possible with conventional handheld measuring systems, since it is not usually possible for the user to probe the workpiece surface in a continuous movement without losing the contact with the workpiece or considerably varying the probing or measuring force. Now, however, the signal generated by the actuator provides the user with feedback on whether the chosen probing or measuring force is in an advantageous range or not. As soon as the user loses the contact with the workpiece, the user receives feedback via the signal generated by the actuator, since the signal is either absent or then generated.

With the information relating to the calculated measuring force, detected measuring points can additionally be evaluated. For example, advantageous or valid measuring points can be distinguished from disadvantageous or invalid measuring points. In this respect too, the user of the measuring system can receive feedback with the aid of the signal generated by the actuator. Instead of a simple differentiation, it is also possible in principle to supplement the measuring points with qualification information, for example a quality value in percent, in order for the user to be able to decide subsequently, according to the measurement task and/or the evaluation, whether or which measuring points are to be rejected.

According to a further refinement, the measuring system further comprises a data memory unit, wherein the evaluation and control unit is configured to store coordinates of the probe body contained in the position data of the probe body in each case as a measurement value in the data memory unit when, on the basis of the position data of the holding part, a predefined movement characteristic is detectable and/or the calculated force exceeds a predefined threshold value.

In this way, probing can be detected automatically and the corresponding measured values can be automatically stored. The manual actuation of an additional switch, as is necessary for example in the device known from DE 10 2015 205 615 A1, does not therefore have to take place here. In this way too, the measurement accuracy can in turn be increased.

It will be appreciated that the features mentioned above and those still to be explained below can be used not only in the respectively cited combination but also in other combinations or singly, without departing from the spirit and scope of the present disclosure.

BRIEF DESCRIPTION OF THE DRAWINGS

Exemplary embodiments are depicted in the drawings and explained in more detail in the following description. In the drawings.

DESCRIPTION OF PREFERRED EMBODIMENTS

Figure 1:
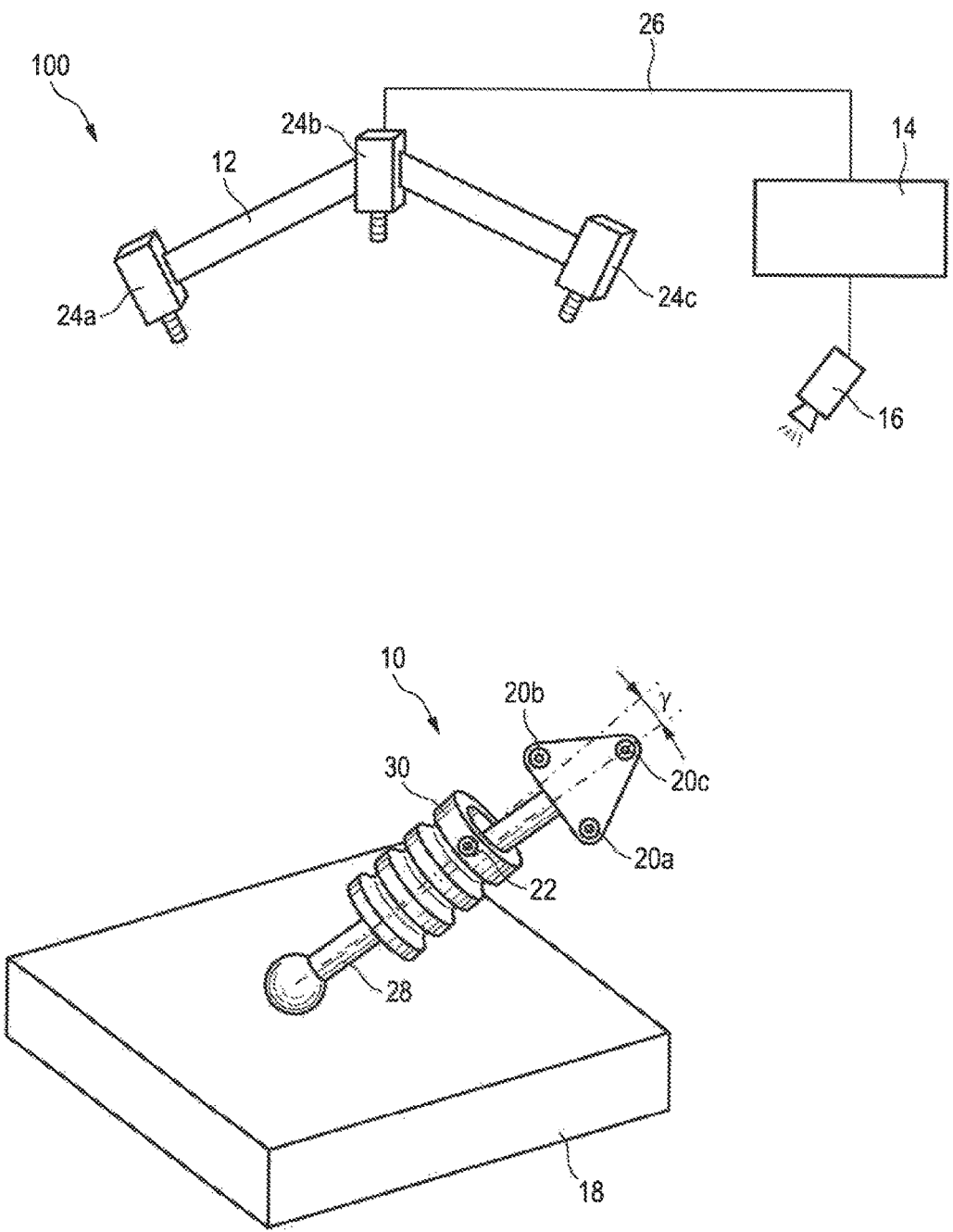
FIG. 1 shows a simplified schematic view of an illustrative embodiment of the measuring system with the measuring device.
Figure 4:
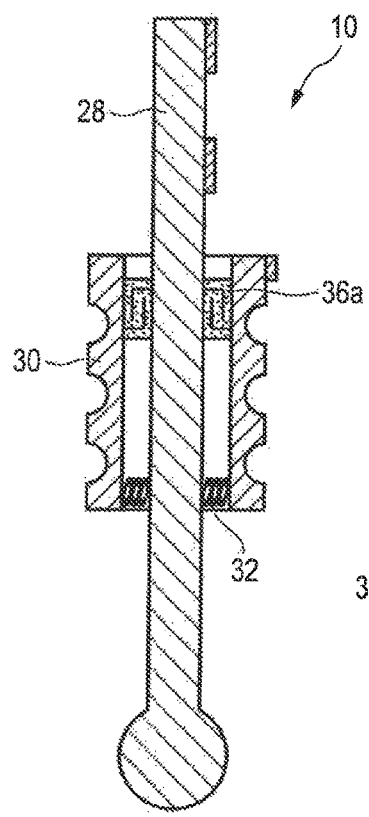
FIG. 4 shows a sectional view of a second illustrative embodiment of the measuring device.
Figure 5:
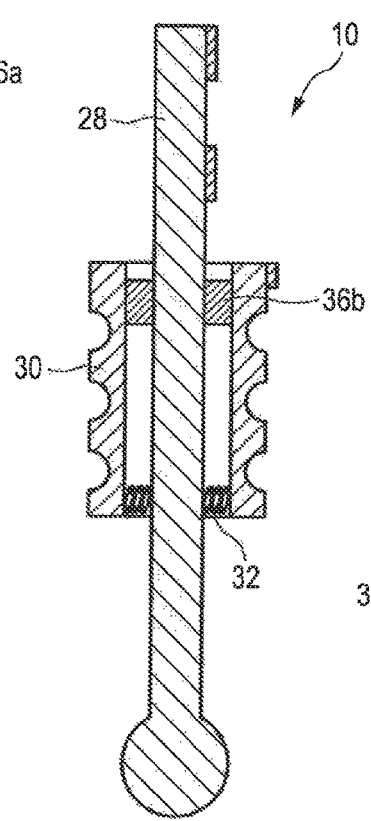
FIG. 5 shows a sectional view of a third illustrative embodiment of the measuring device.
Figure 6:
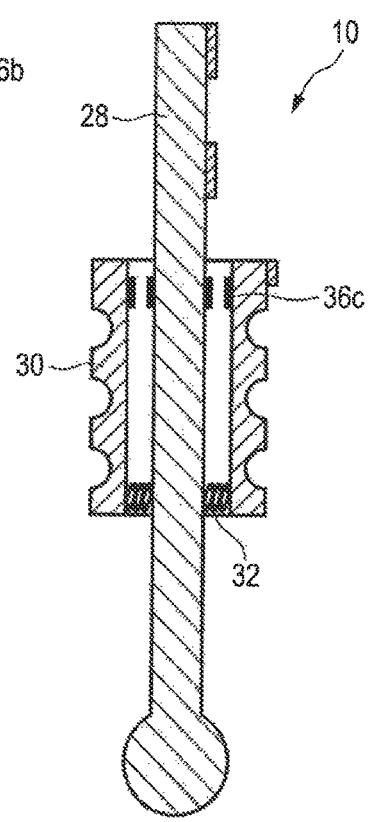
FIG. 6 shows a sectional view of a fourth illustrative embodiment of the measuring device.

FIG. 1 shows a simplified view of an illustrative embodiment of the measuring system with the measuring device n. The measuring system is indicated therein in its entirety by reference number 100. The measuring device is identified by reference number 10. The measuring device 10 is shown in detail in a plan view in FIG. 2 and in a sectional view in FIG. 3. Further illustrative embodiments of the measuring device 10 are shown in FIGS. 4-6.

The measuring system 100 comprises, in addition to the measuring device 10, also a camera system 12, an evaluation and control unit 14 and an actuator 16. While the measuring device 10, the camera system 12 and the evaluation and control unit 14 are obligatory features of the measuring system 100, the actuator 16 is an optional component and is not strictly necessary.

The measuring device 10 serves for tactile probing of a workpiece 18. This probing can be carried out manually, i.e. guided by hand, or automatically with the aid of a suitable machine, for example a robot. During the probing of the workpiece 18, the position of the measuring device 10 is detected with the aid of the tracking system composed of camera system 12 and evaluation and control unit 14. This position detection preferably takes place continuously or with a probing frequency of preferably 200 Hz or higher. The position detection takes place, on the basis of the camera images captured by the camera system 12, inside the evaluation and control unit 14 with the aid of known evaluation algorithms, which usually employ triangulation methods. The detection of the measuring device 10 inside the camera images is made easier here by a plurality of optical marker elements 20a-20c, 22, which are mounted on the measuring device 10 in order to identify the latter and to determine its position and location.

The camera system 12 in the present case is a system composed of three cameras 24a-24c. In principle, however, a single camera would also be sufficient to carry out the method described here. It will be appreciated, however, that it is also possible to use more than three cameras.

The evaluation and control unit 14 is preferably a computing unit, for example a computer, on which suitable software is installed by means of which the camera images supplied by the camera system 12 can be suitably evaluated in order to be able to determine the position of the measuring device 10 as coordinates in any desired fixed coordinate system.

As is shown in FIG. 1, the connection 26 between camera system 12 and evaluation and control unit 14 can be via a corresponding cable. As an alternative to this, however, the camera system 12 can also be connected to the evaluation and control unit 14 without a cable. Similarly, it would be possible to accommodate the camera system 12 and the evaluation and control unit 14 in a common housing by implementing the evaluation and control unit 14 in the form of a processor chip. Moreover, a screen and a corresponding input unit (for example a keyboard) can belong to the measuring system 100 in order to be able to present the measurement results suitably in graph form and to input control commands.

Figure 2:
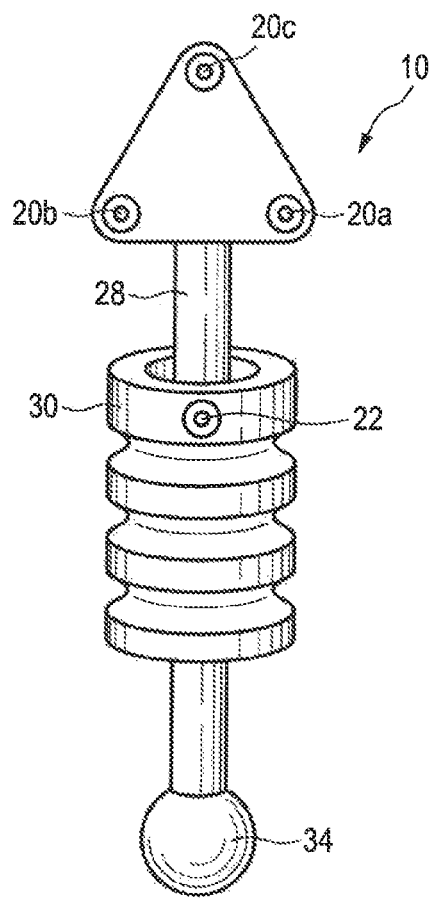
FIG. 2 shows a plan view of a first illustrative embodiment of the measuring device.
Figure 3:
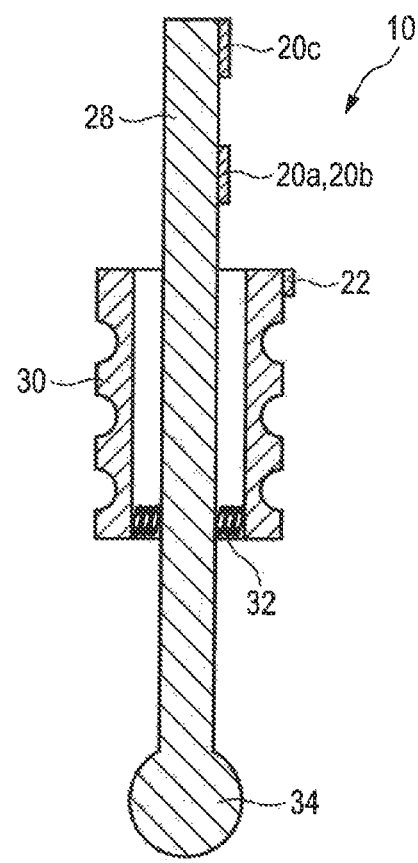
FIG. 3 shows a sectional view of the first illustrative embodiment of the measuring device shown in FIG. 2.

The measuring device 10 comprises a rigid body 28, a holding element 30, and a spring element 32 via which the rigid body 28 is connected to the holding part 30 (see FIGS. 2 and 3). In the present case, the rigid body 28 is substantially rod-shaped. The marker elements 20a-20c are arranged in the area of a first end of the rigid body 28. In the present illustrative embodiment, a probe body 34 designed as a probe sphere is arranged at the opposite, second end of the substantially rod-shaped, rigid body 28. However, the probe body 34 does not necessarily need to have the shape of a sphere. Depending on the measurement task, the probe body 34 can also be designed as a measuring tip. In principle, another kind of tool can also be arranged here instead of the probe body 34. The probe body 34, or instead the tool arranged on the rigid body 28, is preferably connected fixedly to the rigid body 28. In principle, however, it is also conceivable that different kinds of probe bodies 34 or tools are connected to the rigid body 28 via a corresponding adapter and connection mechanism.

In the present illustrative embodiment, the holding part 30 is designed as a kind of handle which allows the measuring device 10 to be secured and guided by hand. For this purpose, the holding part 30, as shown here in FIGS. 2 and 3, can have an external shape that allows the measuring device 10 to be held ergonomically. As an alternative to this, however, the holding element 30 can also have a clamping portion which allows the measuring device 10 to be clamped in a machine, for example in a robot, in order to move it automatically or under machine control.

A characteristic feature of the measuring device 10 is the mobility of the rigid body 28, and of the probe body 34 connected thereto, relative to the holding part 30. This mobility is ensured by the spring element 32, which preferably acts as sole connection element between the rigid body 28 and the holding part 30. During a probing procedure, in which contact takes place between the probe body 34 and a workpiece 18 to be measured, the rigid body 28 therefore moves with respect to the holding part 30. This is indicated schematically in FIG. 1 and identified by the angle φ. Depending on the nature of the spring element 32, this relative movement has translatory and also rotatory movement components. Although the spring element 32 in FIG. 3 is shown schematically as a helical spring, it is preferable to use a cardan spring or a spring parallelogram as spring element 32.

To be able to detect said relative movement between rigid body 28 and holding part 30 on the basis of the camera images generated by the camera system 12, each of said two parts of the measuring device 10 comprises a respective marker 20, 22, which has at least one marker element, preferably several marker elements. In the illustrative embodiment of the measuring device 10 shown in FIG. 2, three marker elements 20a-20c are arranged on the rigid body 28. These marker elements 20a-20c are here designated jointly as first marker 20. The individual marker elements 20a-20c of the first marker 20 are preferably all arranged in one plane, but at a certain predefined distance from one another. The marker 22 arranged on the holding part 30 is designated as second marker. In the present illustrative embodiment, it is composed of a single marker element. In principle, however, the second marker can also have more than just one marker element.

All of the marker elements 20a-20c, 22 in FIG. 2 are shown in a simplified manner as circular elements. However, this is just one example of the design of the marker elements 20a-20c, 22. In principle, they can be of any desired shapes that are able to be identified clearly as markers with the aid of the camera system 12. However, they are preferably passive marker elements.

With the aid of the first marker 20, the position and location of the rigid body 28 can be determined on the basis of the camera images. When the position and location of the first marker 20 are known, the position and location of the probe body 34 are then also known with the aid of a suitable previous calibration of the measuring device 10. Through additional detection of the second marker 22, it is possible to determine the movement and the relative position of the holding part 30 relative to the rigid body 28 since the change of position of the marker elements 20a-20c relative to the marker element 22 is determined in the evaluation and control unit 14 on the basis of the camera images. The items of information concerning the position and location of the rigid body 28 are here designated as position data. The items of information which concern the position and location of the holding part 30 relative to the rigid body 28, which characterize the movement of the holding part 30 relative to the rigid body 28, are designated here as movement data.

A probing procedure can be detected as follows with the aid of the measuring system 100: The evaluation and control unit 14 is configured to detect probing of a workpiece 18 when, on the basis of the position data and movement data, a predefined movement characteristic is detectable. In the case of probing, the holding part 30 typically moves counter to the probe body 34. This can be formulated mathematically as follows for example: The speed vector vm of the probe body 34 can be calculated from the first derivative of the position data of the probe body 34 over time. The speed vector of the holding part 30 vs (relative speed with respect to the rigid body 28) can be calculated from the first derivative of the position data of the holding part 30 over time. The acceleration vector of the holding part 30 can correspondingly be calculated from the second derivative of the position data of the holding part 30 over time. A measuring point can thus be detected when, shortly after a brief peak in the acceleration vector of the holding part 30, the rigid body 28 is pivoted by a predefined amount with respect to the holding part 30, resulting in the following equation: vm=−vs.

Since the stiffness properties of the spring element 32 can be defined in advance via simple calibration measurements, it is possible, with the aid of a simple mathematical spring model (F=c·x) and the position data of the holding part 30, also to calculate the force that acts on the probe body 34 during probing. For measuring sensors, there are a number of known methods for determining the stiffness of such a spring system and of the probe pin (rigid body 28 including probe body 34) by suitable calibration measurement. This can be done, for example, with the aid of the methods described in DE 10 2008 049 751 A1 or EP 2 172 735 B1. In principle, however, the stiffness of the spring element 32 and/or of the probe pin 28, 34 can also be obtained from a laboratory measurement or a CAD model and an FEM calculation and can be read for correction from a database or a parameter file into the evaluation and control unit 14. It will be appreciated that the stiffness c is not necessarily a single value but preferably several direction-dependent values, for example in matrix form.

Instead of detecting probing in the manner mentioned above (by detection of a typical movement characteristic of the measuring device 10), probing with the measuring device 10 can also be effected by evaluating the force which is calculated in the abovementioned manner inside the evaluation and control unit 14 and which acts on the probe body 34. As has already been mentioned, the force can be calculated on the basis of the recorded position data of the holding part 30 relative to the rigid body 28 and the stiffness properties known from the spring element 32. The evaluation and control unit 14 can be designed, for example, to detect probing when the calculated force exceeds a predefined threshold value. Upon detection of probing, the evaluation and control unit 14 is preferably configured to store the determined coordinates of the probe body 34 as a measurement value in a suitable memory unit, for example on a hard disk. Individual measuring points can thus be stored automatically.

Moreover, the abovementioned calculation of the measuring force with the aid of the measuring system 100 permits a continuous measurement of measuring points during what is called a scanning method. The evaluation and control unit 14 can in fact be configured to provide the user with an acoustic, optical or haptic signal with the aid of the actuator 16 when the probe body 34 is pressed, with a force suitable for measurements, onto the workpiece 18 that is to be measured. The actuator 16 can be designed, for example, as a loudspeaker or as a simple light. This feedback allows the user to move the measuring device 10 in the "correct" way across the surface of the workpiece 18 that is to be measured.

The evaluation and control unit 14 can also be configured to use the calculated measuring force as information for an assessment of the stored measuring points. For example, it is possible to define a measuring force range within which measuring points are regarded as valid and outside of which measuring points are regarded as invalid. For the measurement of individual points, or also during a scanning measurement, the change of direction of the measuring force or the change of direction of the movement data can also be used for the assessment. Thus, favourable measuring points can be distinguished from unfavourable measuring points. However, it is also possible to supplement the measuring points with qualification information, for example a quality value in percent, in order to decide subsequently, according to the measurement task and the evaluation, whether the measuring points are to be accepted or rejected.

The abovementioned calculation of the measuring force, which the measuring system permits through optical evaluation of the camera images, can also be used moreover to correct the measured values. The measuring force that arises in a probing procedure generally leads to a not inconsiderable deformation of the rigid body 28 on account of bending stress. To correct this deformation, a correction vector can therefore be calculated for each measuring point. This correction vector can be calculated from the calculated measuring force and from the stiffness properties of the rigid body or of the probe pin 28. Correction calculation methods of this kind are known from DE 10 2008 049 751 A1 and EP 2 172 735 B1.

Alternatively, for the measurement of individual measuring points, it is also possible to calculate back to the force-free state in order to correct the measured values. Such a back-calculation is in most cases carried out using techniques that use an extrapolation of the measured values. Examples of techniques of this kind are known from EP 0 753 717 A2, EP 0 556 574 A2 and EP 0 599 513 A1. For this purpose, the position data and force data are usually recorded during the measurement of an individual point. During detection of a probing procedure, the measured values are detected from contact until the maximum deflection of the rigid body 28 relative to the holding part 30 and during movement of the measuring device 10 away from the workpiece 18 until the force-free state. However, the force-free state is not indicated in the measured values by a force "0" but instead by vibration-induced noise. The data should therefore be filtered and, for example, used only within a defined force range. By means of the aforementioned interpolation or extrapolation techniques, it is then possible to calculate back to the force-free state in order to accordingly correct the measured value detected for the respective measuring point.

Since the abovementioned probing movements will in principle involve vibrations which cause unwanted measurement noise, the measuring device 10 preferably comprises a damping element 36. Illustrative embodiments in which the rigid body 28 is connected to the holding part not only via the spring element 32 but also via such a damping element 36 are shown in the sectional views in FIGS. 4-6. FIG. 4 shows an illustrative embodiment with a fluidic damper 36a. FIG. 5 shows an illustrative embodiment with an elastomeric damper 36b. FIG. 6 shows an illustrative embodiment with a damping element 36c, which is designed as a magnetic damper. A magnetic damper is preferably used that employs an eddy current damping principle.

As has already been mentioned before, it will be noted once again in conclusion that the measuring system can be used not only for pure measurement processes but also, for example, in machining equipment for regulating the force and position of a machine tool. Instead of the probe body 34, a tool such as a gripper or drill could be mounted in this case on the rigid body 28. Position and location determination and force calculation would then also take place in the same way on the basis of the abovementioned optical evaluation principle.

What is claimed is:

1. Measuring device for an optical measuring system, comprising:
   a rigid body which comprises a probe body or a tool, wherein a first optical marker is arranged on the rigid body;
   a holding part for holding the measuring device by hand or for clamping the measuring device in a machine, wherein at least a second optical marker is arranged on the holding part; and
   a spring element which connects the rigid body to the holding part.

2. Measuring device according to claim 1, wherein the first optical marker comprises at least three optical marker elements arranged on the rigid body.

3. Measuring device according to claim 2, wherein the optical marker elements are passive optical marker elements which are arranged in one common plane.

4. Measuring device according to claim 1, wherein the rigid body is substantially rod-shaped, wherein the first optical marker is arranged at a first position which is arranged closer to a first end of the rigid body than to a second end of the rigid body, said second end being opposite said first end, wherein the probe body or the tool is arranged at a second position which is arranged closer to said second end than to said first end, and wherein the spring element engages the rigid body between said first position and said second position.

5. Measuring device according to claim 1, wherein the probe body comprises a probe sphere or probe tip.

6. Measuring device according to claim 1, wherein the spring element comprises a spring parallelogram or a cardan spring element.

7. Measuring device according to claim 1, wherein the measuring device comprises a damping element which connects the rigid body to the holding part.

8. Measuring device according to claim 7, wherein the rigid body is connected to the holding part solely via the spring element and the damping element.

9. Measuring device according to claim 7, wherein the damping element comprises a magnetic damper, a fluidic damper, or an elastomeric damper.

10. Measuring system comprising:
a measuring device having:
(i) a rigid body which comprises a probe body or a tool, wherein a first optical marker is arranged on the rigid body,
(ii) a holding part for holding the measuring device by hand or for clamping the measuring device in a machine, wherein at least a second optical marker is arranged on the holding part, and
(iii) a spring element which connects the rigid body to the holding part,
a camera for capturing image data of the measuring device; and
an evaluation and control unit, which is configured to evaluate the image data captured by the camera and to determine position data of the measuring device based on said image data.

11. Measuring system according to claim 10, wherein the evaluation and control unit is configured to use the image data captured by the camera to determine position data of the rigid body, which describe a position of the rigid body, based on the first optical marker, and to determine position data of the holding part, which describe a relative position of the holding part relative to the rigid body, based on the first and second optical markers.

12. Measuring system according to claim 11, wherein the evaluation and control unit is configured to calculate a force which is applied to the probe body or the tool, based on the position data of the holding part and a stiffness of the spring element.

13. Measuring system according to claim 12, wherein the evaluation and control unit is configured to determine position data of the probe body, which describe a position of the probe body, based on the position data of the rigid body, and wherein the evaluation and control unit is configured determine a correction vector based on the calculated force, and to determine corrected position data of the probe body based on the position data of the probe body and the correction vector.

14. Measuring system according to claim 12, wherein the measuring system further comprises an optical, acoustic or haptic actuator, and wherein the evaluation and control unit is configured to control the actuator to generate an optical, acoustic or haptic signal when the calculated force exceeds a first threshold value or drops below a second threshold value.

15. Measuring system according to claim 12, wherein the measuring system further comprises a data memory unit, wherein the evaluation and control unit is configured to store the position data of the probe body in the data memory unit each time a predefined movement characteristic is detectable based on the position data of the holding part, and/or each time the calculated force exceeds a predefined threshold value.

16. Measuring system according to claim 10, wherein the first optical marker comprises at least three optical marker elements arranged on the rigid body.

17. Measuring system according to claim 10, wherein the rigid body is substantially rod-shaped, wherein the first optical marker is arranged at a first position which is arranged closer to a first end of the rigid body than to a second end of the rigid body, said second end being opposite said first end, wherein the probe body or the tool is arranged at a second position which is arranged closer to said second end than to said first end, and wherein the spring element engages the rigid body between said first position and said second position.

18. Measuring system according to claim 10, wherein the probe body comprises a probe sphere or probe tip.

19. Measuring system according to claim 10, wherein the measuring device comprises a damping element which connects the rigid body to the holding part.

20. Measuring device according to claim 19, wherein the rigid body is connected to the holding part solely via the spring element and the damping element.

* * * * *